United States Patent [19]

Inokuchi et al.

[11] Patent Number: 5,538,793
[45] Date of Patent: Jul. 23, 1996

[54] SILICONE RUBBER PARTICLES COATED WITH SILICONE RESIN

[75] Inventors: Yoshinori Inokuchi, Annaka; Satoshi Kuwata, Takasaki, both of Japan

[73] Assignee: Shin-Etsu Chemical Co., Ltd., Tokyo, Japan

[21] Appl. No.: 362,956

[22] Filed: Dec. 23, 1994

[30] Foreign Application Priority Data

Dec. 28, 1993 [JP] Japan ................................. 5-338028

[51] Int. Cl.⁶ ........................................................ B32B 27/00
[52] U.S. Cl. ........................... 428/407; 428/447; 525/477
[58] Field of Search ................................. 428/407, 447; 525/477

[56] References Cited

U.S. PATENT DOCUMENTS

| | | | |
|---|---|---|---|
| 4,742,142 | 3/1988 | Shimizu et al. | 528/15 |
| 4,761,454 | 8/1988 | Oba | 524/862 |
| 5,034,476 | 7/1991 | Saito et al. | 525/477 |
| 5,106,922 | 4/1992 | Saito et al. | 525/477 |

FOREIGN PATENT DOCUMENTS

| | | |
|---|---|---|
| 0169386 | 1/1986 | European Pat. Off. . |
| 0298743 | 1/1989 | European Pat. Off. . |
| 0373941 | 6/1990 | European Pat. Off. . |
| 0511092 | 10/1992 | European Pat. Off. . |
| 2630125 | 10/1989 | France . |
| 5-170909 | 7/1993 | Japan . |

*Primary Examiner*—Ralph H. Dean
*Attorney, Agent, or Firm*—Wenderoth, Lind & Ponack

[57] ABSTRACT

Proposed is a powder of silicone rubber having improved flowability and dispersibility consisting of particles of a cured silicone rubber of which each particle has a coating layer of a polyorganosilsesquioxane resin in a specified coating amount. The powder is prepared by the admixture of an aqueous dispersion of a cured silicone rubber particles, which is preferably prepared by the hydrosilation reaction between a vinyl group-containing organopolysiloxane and an organohydrogen polysiloxane emulsified in an aqueous medium, with a trialkoxy silane compound such as methyl trimethoxy silane together with an alkaline compound, e.g., ammonia water, under agitation so that the hydrolysis-condensation reaction of the trialkoxy silane compound proceed to form a coating layer on the surface of the silicone rubber particles.

10 Claims, No Drawings

SILICONE RUBBER PARTICLES COATED WITH SILICONE RESIN

BACKGROUND OF THE INVENTION

The present invention relaters to silicone rubber particles coated with a silicone resin and a method for the preparation thereof. More particularly, the invention relates to silicone resin-coated fine silicone rubber particles exhibiting excellent flowability and dispersibility in and compatibility with various kinds of matrix materials to give a composite material imparted with markedly decreased internal stress and greatly improved surface lubricity as well as to a method for the preparation of such silicone rubber particles.

It is known in the prior art that fine particles can be prepared from several silicone materials, i.e. organopolysiloxanes, including cured silicone rubbers and poly(organosilsesquioxane) resins. These silicone particles are useful as an additive ingredient in various kinds of matrix materials such as rubbers, plastics, coating compositions or paints, printing inks, waxes, cosmetic compositions and the like with an object to impart the matrix material with improved heat and cold resistance, weatherability, water-repellency, surface lubiricity and mold releasability as well as to decrease the internal stress of shaped articles. Fine particles of a silicone rubber are particularly preferred when decrease in the internal stress of shaped articles is desired.

Various methods have been proposed for the preparation of fine particles of a silicone rubber, for example, in U.S. Pat. No. 3,843,601, Japanese Patent Kokai No. 59-96122, No. 62-243621, No. 62-257939, No. 62-270660, No. 63-77942, No. 63-312324 and elsewhere. One of the problems in the silicone rubber fine particles prepared by these prior art methods is that the particles are poorly flowable to cause inconveniences in handling and they can hardly be dispersed in various matrix materials with full uniformity because the particles strongly agglomerate in addition to the relatively low effect of internal stress relaxation of shaped articles due to their poor compatibility with the matrix material.

A method is proposed in Japanese Patent Kokai No. 4-348143 and No. 5-179144, according to which fine particles of a silicone rubber are compounded with fine inorganic particles to improve the flowability of the particles with decreased agglomeration but no solution is obtained thereby for the problem of poor compatibility of silicone rubber particles with matrix materials.

Further, several proposals and attempts have been made with an object to improve the compatibility of silicone rubber particles with various matrix materials including admixture of the silicone rubber with an epoxy compound disclosed in Japanese Patent Kokai No. 64-56735 and admixture of the silicone rubber with an alkoxy silane compound disclosed in Japanese Patent Kokai No. 64-700558. The improvement in the compatibility of silicone rubber particles obtained by these methods, however, is still not high enough rather with some adverse influences on the flowability and agglomeration of the silicone rubber particles.

Apart from silicone rubber particles, Japanese Patent Kokai No. 5-170909 discloses a method for the preparation of an aqueous dispersion of which the dispersed phase consists of fine particles of a fluorocarbon resin containing an organopolysiloxane formed by in situ hydrolysis-condensation of a hydrolyzable organosilane compound in the resin particles. This method, however, is not suggestive for the improvement of silicone rubber particles relative to the flowability and agglomeration.

SUMMARY OF THE INVENTION

The present invention accordingly has an object to provide fine particles of a silicone rubber freed from the above described problems and disadvantages in the prior art as well as a method for the preparation thereof so as to impart the silicone rubber particles with increased flowability as a powder and decreased agglomeration as well as improved compatibility with various kinds of matrix materials.

Thus, the invention provides fine particles of a silicone rubber of which the particles have a composite structure consisting of a spherical or globular particle of a cured silicone rubber having an average particle diameter in the range from 0.1 to 100 µm and a coating layer of a polyorganosilsesquioxane resin, the coating amount of the polyorganosilsesquioxane resin being in the range from 1 to 500 parts by weight per 100 parts by weight of the silicone rubber particles before coating.

The above defined silicone resin-coated silicone rubber particles can be prepared according to the invention by a method which comprises the step of: admixing an aqueous dispersion of particles of a cured silicone rubber having an average particle diameter in the range from 0.1 to 100 µm with an alkaline compound and a trialkoxy silane compound represented by the general formula

$R^2Si(OR^1)_3$, in which $R^2$ is an unsubstituted or substituted monovalent hydrocarbon group and $R^1$ is an alkyl group having 1 to 6 carbon atoms, in combination at a temperature not exceeding 60° C. under agitation.

DETAILED DESCRIPTION OF THE PREFERRED EMBODIMENTS

As is described above, the fine particles of the invention are characterized by the composite structure of the particles consisting of a cured silicone rubber particle having a specified average particle diameter and a coating layer thereon formed from a polyorganosilsesquioxane resin in a specified coating amount and the coated silicone rubber particles can be prepared by the in situ hydrolysis and condensation reaction of a trialkoxy silane compound in the presence of cured silicone rubber particles in an aqueous dispersion so as to form the coating layer of a polyorganosilsesquioxane resin on the surface of the silicone rubber particles.

The silicone rubber forming the fine core particles, on which the coating layer of the polyorganosilsesquioxane resin is formed, is a cured diorganopolysiloxane having linear diorganopolysiloxane segments represented by the general formula

$$+R_2Si-O\!\!\!+_{\overline{a}}, \qquad (1)$$

in which each R is, independently from the others, an unsubstituted or substituted monovalent hydrocarbon group having 1 to 20 carbon atoms exemplified by alkyl groups such as methyl, ethyl, propyl and butyl groups, aryl groups such as phenyl and tolyl groups, alkenyl groups such as vinyl and allyl groups and aralkyl groups such as 2-phenylethyl and 2-phenylpropyl groups as well as those substituted hydrocarbon groups obtained by replacing a part or all of the hydrogen atoms in the above named hydrocarbon groups with substituents including halogen atoms, epoxy group, amino group, mercapto group, (meth)acryloxy group and the like such as chloromethyl and 3,3,3-trifluoropropyl groups, at least 90% by moles of the groups R being preferably methyl groups, and the subscript a is a positive integer in the range, though not particularly limitative, from 5 to 5000 or, preferably, from 10 to 1000. When the value of the subscript a is too small, the silicone rubber particles after coating with the silicone resin cannot impart the matrix material compounded therewith with a decreased internal stress and improved surface lubricity while, when the value of the subscript a is too large, difficulties are encountered in the preparation of silicone rubber particles. It is optional that the silicone rubber forming the fine particles is compounded with a silicone oil, organosilane compound, inorganic and organic powders and the like.

It is essential that the silicone rubber particles to be coated with a coating layer of the silicone resin have an average particle diameter in the range from 0.1 to 100 μm or, preferably, from 1 to 30 μm. When the average particle diameter of the silicone rubber particles is too small, the flowability of the particles as a powder is unduly decreased with increased agglomeration while, when the average particle diameter thereof is too large, no improvement can be obtained in the surface lubricity of the shaped articles of a composition compounded with the silicone resin-coated silicone rubber particles along with a decrease in the physical properties of the shaped articles.

The above described fine particles of a cured silicone rubber are prepared preferably, according to the procedure disclosed in, for example, Japanese Patent Kokai No. 62-243621 and No. 62-257939, by utilizing the addition reaction of so-called hydrosilation between (a) a vinyl group-containing organopolysiloxane having at least two silicon-bonded vinyl groups in a molecule and (b) an organohydrogenpolysiloxane as a crosslinking agent having at least two hydrogen atoms directly bonded to the silicon atoms in a molecule in the presence of (c) a catalytic amount of a platinum compound as a catalyst although other types of reactions can be used for the formation of crosslinks including the condensation reaction between silicon-bonded alkoxy groups and silanol groups, radical reaction between silicon-bonded mercapto groups and silicon-bonded vinyl groups and so on.

In the above mentioned vinyl group-containing organopolysiloxane having at least two silicon-bonded vinyl groups in a molecule, the vinyl groups can be bonded to the silicon atoms at any positions in the organopolysiloxane molecule but it is preferable that at least each of the silicon atoms at the molecular chain ends has a vinyl group directly bonded thereto. The silicon-bonded organic groups other than the vinyl groups can be alkyl, aryl and aralkyl groups belonging to the class given as the examples of the group denoted by R in the formula (I) but at least 90% by moles thereof are preferably methyl groups. The molecular structure of the organopolysiloxane forming the silicone rubber can be straightly linear, branched or cyclic. The molecular structure of the silicone rubber is not particularly limitative provided that a cured silicone rubber having rubbery elasticity can be obtained therefrom but the organopolysiloxane before curing should have a viscosity not exceeding 100,000 centistokes at 25° C. because the reactivity with the organohydrogenpolysiloxane is decreased when the average molecular weight of the vinyl-containing organopolysiloxane is too high.

The vinyl group-containing organopolysiloxane mentioned above is represented, when it has a straightly linear molecular structure, for example, by the general formula

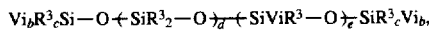

in which $R^3$ is a monovalent hydrocarbon group other than alkenyl, Vi is a vinyl group, the subscripts b and c are each 0, 1, 2 or 3 with the proviso that b+c is 3, the subscript d is a positive integer and the subscript e is 0 or a positive integer with the proviso that 2b+e is at least 2. When the vinyl group-containing organopolysiloxane has a cyclic molecular structure, it is typically represented by the formula

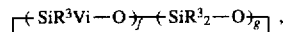

in which $R^3$ and Vi each have the same meaning as defined above, the subscript f is a positive integer of 2 or larger and the subscript g is 0 or a positive integer with the proviso that f+g is in the range from 4 to 8. When the vinyl group-containing organopolysiloxane has a branched molecular structure, it is preferable that the organopolysiloxane consists of monofunctional siloxane units and tetrafunctional siloxane units as represented by the unit formula

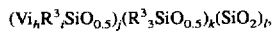

in which $R^3$ and Vi each have the same meaning as defined above, the subscript h is 1, 2 or 3, the subscript i is 0, 1 or 2 with the provide that h+i is 3 and the subscripts j, k and l are each a positive number.

The organohydrogenpolysiloxane serves as a crosslinking agent for the above described vinyl group-containing organopolysiloxane by the addition reaction between the silicon-bonded hydrogen atoms and the silicon-bonded vinyl groups in the presence of a platinum catalyst to form crosslinks. It is essential therefore that the organohydrogenpolysiloxane has at least two or, preferably, at least three silicon-bonded hydrogen atoms in a molecule. The organic groups bonded to the silicon atoms in the organohydrogenpolysiloxane can be the same as R in the vinyl group-containing organopolysiloxane excepting alkenyl groups, of which at least 90% by moles are preferably methyl groups.

The molecular structure of the organohydrogenpolysiloxane can be straightly linear, branched or cyclic without particular limitations. The average molecular weight thereof is also not particularly limitative but it is preferable that the viscosity thereof does not exceed 10,000 centistokes at 25° C. because, when the molecular weight thereof is too large, a decrease is caused in the reactivity with the vinyl group-containing organopolysiloxane.

The organohydrogenpolysiloxane mentioned above is represented, when it has a straightly linear molecular structure, for example, by the general formula

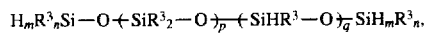

in which $R^3$ has the same meaning as defined above, the subscript m is 0 or 1, the subscript n is 2 or 3 with the proviso that m+n is 3, the subscript p is 0 or a positive integer and the subscript q is 0 or a positive integer with the proviso that 2m+q is at least 2. When the organohydrogenpolysiloxane has a cyclic molecular structure, it is typically represented by the formula

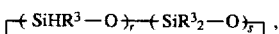

in which $R^3$ has the same meaning as defined above, the subscript r is a positive integer of 2 or larger and the subscript s is 0 or a positive integer with the proviso that r+s is in the range from 4 to 8. When the organohydrogenpolysiloxane has a branched molecular structure, it is preferable that the organohydrogenpolysiloxane consists of monofunctional siloxane units and tetrafunctional siloxane units as represented by the unit formula

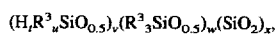

in which $R^3$ has the same meaning as defined above, the subscript t is 1, 2 or 3, the subscript u is 0, 1 or 2 with the proviso that t+u is 3 and the subscripts v, w and x are each a positive number.

Since the organohydrogenpolysiloxane serves as a crosslinking agent for the above described vinyl group-containing organopolysiloxane by the addition reaction between the silicon-bonded hydrogen atoms and the silicon-bonded vinyl groups in the presence of a platinum catalyst to form crosslinks, the amount thereof should be such that from 0.5 to 20 or, preferably, from 0.5 to 5 silicon-bonded hydrogen atoms are provided thereby per vinyl group in the vinyl group-containing organopolysiloxane. When the amount of the organohydrogenpolysiloxane is too small relative to the silicon-bonded vinyl groups, the crosslinking density would be so low that no effective curing of the silicone rubber can be obtained. When the amount thereof is too large, on the other hand, adverse influences are caused in the properties of the silicone rubber after curing due to the presence of unreacted silicon-bonded hydrogen atoms.

Platinum compounds are well known to have catalytic activity to promote the hydrosilation reaction between silicon-bonded vinyl groups and silicon-bonded hydrogen atoms. Any of catalytic platinum compounds known and used in the prior art for the purpose can be used here for the preparation of the cured silicone rubber particles including carbon- or silica-based solid catalyst supporting a platinum ingredient, chloroplatinic acid, platinum complexes of olefins, platinum complexes of alcohols, platinum complexes of phosphorus compounds, coordination compounds of platinum and the like. The amount of the catalytic platinum compound used in the reaction is preferably in the range from 1 to 100 ppm by weight calculated as platinum based on the amount of the vinyl group-containing organopolysiloxane. When the amount of the platinum catalyst is too small, the velocity of curing by the hydrosilation reaction is unduly low along with predominant adverse influences caused by a catalyst poison while no particular additional advantages can be obtained by increasing the amount of the platinum catalyst over the above mentioned upper limit rather with an economical disadvantage due to the expensiveness of the platinum compound.

Various known procedures are applicable to the preparation of fine particles of a cured silicone rubber from the above described reactants and catalyst. For example, a liquid mixture of the reactants with admixture of the catalyst is sprayed at a high temperature into fine droplets in which the reaction proceeds to form a crosslinked silicone rubber or the reactant mixture is dispersed in an organic solvent and the reaction mixture is heated so as to have the reaction proceed in the dispersed phase. Most advantageously, however, the liquid reactant mixture with admixture of the catalyst is emulsified by using a suitable mixing machine in an aqueous medium containing a surface active agent and the emulsion is heated so that the hydrosilation reaction proceeds in the dispersed liquid phase to convert the dispersed droplets into solid particles of a cured silicone rubber to give an aqueous dispersion or suspension of fine particles of a cured silicone rubber which can be used as such for the subsequent treatment for the formation of the coating layer of the polyorganosilsesquioxane resin.

Though not particularly limitative, the surface active agent used here is preferably a non-ionic surface active agent such as polyoxyethylene alkyl ethers, polyoxyethylene alkylphenyl ethers, polyoxyethylene sorbitan fatty acid esters and glycerin fatty acid esters because these surface active agents have little adverse influences on the hydrosilation reaction. The amount of the surface active agent is in the range, usually, from 0.01 to 20 parts by weight or, preferably, from 0.05 to 10 parts by weight per 100 parts by weight of the total amount of the emulsion to be obtained. When the amount of the surface active agent is too small, stability cannot be given to the aqueous emulsion of fine droplets of the reactant mixture while, when the amount thereof is too large, an adverse influence is caused in the subsequent step for the formation of the coating layer of the polyorganosilsesquioxane resin on the cured rubber particles.

The thus prepared aqueous emulsion contains the reactant mixture consisting of the vinyl group-containing organopolysiloxane and the organohydrogenpolysiloxane in an amount in the range from 1 to 80% by weight or, preferably, from 10 to 60% by weight. When the content of the reactant mixture is too small in the emulsion, an economical disadvantage is caused due to the excessively large volume of the emulsion to be handled while, when the content of the reactant mixture is too high, coalescence is sometimes caused between the silicone rubber particles not to give an aqueous dispersion of discrete spherical or globular silicone rubber particles having the specified average particle diameter.

When it is desired to impart the silicone rubber particles with modified properties, it is optional that the reactant mixture to be emulsified in the aqueous medium is admixed beforehand with various modifying agents such as silicone oils, organosilane compounds, inorganic and organic powders and the like according to need.

The thus obtained aqueous emulsion of the reactant mixture is admixed with a platinum catalyst, optionally, in combination with a reaction moderator so as to promote the addition reaction between the silicon-bonded vinyl groups and silicon-bonded hydrogen atoms to give a cured silicone rubber in the form of fine particles having an average particle diameter in the range from 0.1 to 100 μm. It is sometimes advantageous that the platinum catalyst and the reaction moderator, if they are hardly dispersible in water, are emulsified beforehand in an aqueous medium by using a surface active agent to form an aqueous emulsion which is introduced into the emulsion of the reactant mixture.

The silicone resin-coated cured silicone rubber particles of the invention can be prepared by coating the particles with a polyorganosilsesquioxane resin, which consists of the trifunctional organosiloxane units represented by the unit formula

in which $R^2$ is an unsubstituted or substituted monovalent hydrocarbon group having 1 to 20 carbon atoms exemplified by alkyl groups such as methyl, ethyl, propyl and butyl groups, aryl groups such as phenyl and tolyl groups, alkenyl groups such as vinyl and allyl groups and aralkyl groups such as 2-phenylethyl and 2-phenylpropyl groups as well as those substituted hydrocarbon groups obtained by replacing a part or all of the hydrogen atoms in the above named hydrocarbon groups with substituents, e.g., halogen atoms, epoxy group, amino group, mercapto group and (meth)acryloxy group, such as chloromethyl and 3,3,3-trifluoropropyl groups. While it is preferable that at least 50% by moles of the groups denoted by $R^2$ in the polyorganosilsesquioxane are methyl groups, certain favorable effects can be expected by combining the methyl groups with other functional groups on the compatibility of the inventive rubber particles with the matrix material or the surface lubricity of the composite material compounded therewith. It is further optional that, besides the above mentioned trifunctional siloxane units, the silicone resin comprises small amounts of mono-, di- and tetrafunctional siloxane units represented by the unit formulas $R^2{}_3SiO_{0.5}$, $R^2{}_2SiO$ and $SiO_2$, respectively, in which $R^2$ has the same meaning as defined above.

Although it is not always necessary that the surface of each of the silicone rubber particles is coated completely or uniformly with the silicone resin, the coating amount with the silicone resin on the cured silicone rubber particles is in the range from 1 to 500 parts by weight or, preferably, from 5 to 100 parts by weight per 100 parts by weight of the cured silicone rubber forming the core particles. When the coating amount is too small, the silicone rubber particles cannot be imparted with improved flowability, dispersibility and compatibility with the matrix materials with which the particles are compounded. When the coating amount is too large, on the other hand, the physical properties inherent in silicone rubber particles can hardly be exhibited.

In the preparation of the silicone resin-coated silicone rubber particles of the invention, the aqueous dispersion or suspension of the cured silicone rubber particles prepared in the above described manner is admixed, under agitation, with a trialkoxy silane compound and a water-soluble alkaline compound either as such or in the form of an aqueous solution so as to effect the hydrolysis-condensation reaction of the trialkoxy silane compound to form the polyorganosilsesquioxane resin.

The content of the silicone rubber particles in the aqueous dispersion or suspension thereof is in the range from 1 to 60 parts by weight or, preferably, from 5 to 40 parts by weight per 100 parts by weight of the aqueous dispersion as a whole. When the content of the silicone rubber particles is too low, a disadvantage is caused because a too large volume of the aqueous dispersion must be treated to obtain an amount of the silicone resin-coated silicone rubber particles while, when the content thereof is too high, uniformity cannot be ensured in the coating process with the silicone resin with eventual agglomeration or coalescence of the silicone rubber particles.

Admixture of the aqueous dispersion of the silicone rubber particles with a surface active agent is sometimes advantageous in order to improve the stability of the aqueous dispersion of the rubber particles and to enhance the uniformity of the resin coating. Examples of surface active agents suitable for this purpose include cationic surface active agents such as quaternary ammonium salts and alkylamine salts, amphoteric surface active agents such as alkylbetaines, non-ionic surface active agents such as polyoxyethylene alkyl ethers, polyoxyethylene alkylphenyl ethers, sorbitan fatty acid esters and glycerin fatty acid esters and anionic surface active agents such as salts of organic sulfonic acids and alkyl sulfonate esters without particular limitations.

The water-soluble alkaline compound to be added to the aqueous dispersion of the silicone rubber particles either as such or in the form of an aqueous solution serves as a catalyst to promote the hydrolysis-condensation reaction of the trialkoxy silane compound. Accordingly, the amount thereof should be sufficient to bring the pH of the aqueous medium of the dispersion in the range from 10.0 to 13.0 or, preferably, from 10.5 to 12.5. When the pH is too low, the desired hydrolysis-condensation reaction of the trialkoxy silane compound cannot proceed at a sufficiently high velocity sometimes to cause agglomeration of the rubber particles while, when the pH is too high, the velocity of the hydrolysis-condensation reaction of the trialkoxy silane compounds is so high that the reaction proceeds not only on the surface of the rubber particles but also within the droplets of the silane compound per se so that a decrease is caused in the efficiency of the coating process.

The water-soluble alkaline compound is not particularly limitative provided that the above mentioned catalytic effect is exhibited including alkali metal hydroxides such as lithium hydroxide, sodium hydroxide and potassium hydroxide, alkaline earth metal hydroxides such as calcium hydroxide and barium hydroxide, alkali metal carbonates such as sodium carbonate and potassium carbonate, ammonia, amine compounds such as methylamine, dimethylamine, ethylamine, diethylamine and ethylenediamine and quaternary ammonium hydroxides such as tetramethyl ammonium hydroxide, of which ammonia is preferred in respect of the good solubility in water, high catalytic activity and vaporizability to ensure complete removal after completion of the reaction. Commercially available ammonia water containing about 28% by weight of ammonia can be used as such quite satisfactorily.

The trialkoxy silane compound to be subjected to the hydrolysis-condensation reaction is represented by the general formula

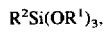

$R^2Si(OR^1)_3$.

in which $R^2$ has the same meaning as defined above and $R^1$ is an alkyl group having 1 to 6 carbon atoms such as methyl, ethyl, propyl and butyl groups. Examples of suitable trialkoxy silane compounds include methyl trimethoxy silane, methyl triethoxy silane, methyl tripropoxy silane, methyl tributoxy silane, ethyl trimethoxy silane, propyl trimethoxy silane, butyl trimethoxy silane, N-(2-aminoethyl)-3-aminopropyl trimethoxy silane, 3-glycidyloxypropyl trimethoxy silane, vinyl trimethoxy silane, phenyl trimethoxy silane, 3-methacryloxypropyl trimethoxy silane, 3-mercaptopropyl trimethoxy silane, 3,3,3-trifluoropropyl trimethoxy silane, 2-(perfluoro-n-butyl)ethyl trimethoxy silane and 2-(perfluoro-n-octyl)ethyl silane. These trialkoxy silane compounds can be used either singly or as a combination of two kinds or more according to need. Although it is preferable that at least 50% by moles of the trialkoxy silane compounds used in the inventive method is methyl trimethoxy silane, certain additional improvements can be obtained by the combined use thereof with other functional trialkoxy silane compounds in respect of the compatibility of the silicone resin-coated silicone rubber particles with various kinds of matrix materials and the surface lubricity of the shaped articles prepared from a composition compounded with the particles.

The amount of the trialkoxy silane compound introduced into the aqueous dispersion of the silicone rubber particles should be sufficient to provide the polyorganosilsesquioxane resin in an amount in the range from 1 to 500 parts by weight or, preferably, from 5 to 100 parts by weight of the resin per 100 parts by weight of the silicone rubber particles but the amount should not exceed, preferably, 20 parts by weight of the aqueous medium in the aqueous dispersion of the silicone rubber particles because, when the amount of the trialkoxy silane compound is too large, a trouble is caused that aggregates of the resin per se are eventually formed in the aqueous dispersion.

While it is important that the trialkoxy silane compound and the water-soluble alkaline compound are introduced into the aqueous dispersion of the silicone rubber particles under agitation, care must be taken that the agitation is not too vigorous, especially, when the amount of the trialkoxy silane compound is relatively large in order to avoid eventual agglomeration or coalescence of the particles. The type of the stirrer device is not particularly limitative and can be conventional including those having propellor blades or paddle blades.

The hydrolysis-condensation reaction of the trialkoxy silane compound is performed at a temperature in the range from 0° to 60° C. or, preferably, from 5° to 20° C. A temperature lower than 0° C. is of course not practicable due to freezing of the aqueous medium while, when the temperature is too high, aggregates of the silicone resin per se are formed along with possible agglomeration or coalescence of the particles in the aqueous dispersion. The trialkoxy silane compound and the water-soluble alkaline compound can be introduced into the aqueous dispersion of the silicone rubber particles either concurrently or separately one following the other. It is preferable when the amount of the trialkoxy silane compound is relatively large that addition of the alkaline compound precedes the addition of the trialkoxy silane compound. Although the trialkoxy silane compound can be added at one time into the aqueous dispersion of the silicone rubber particles, it is an advantageous way, especially when the amount of the trialkoxy silane compound is relatively large, that the silane compound is introduced gradually or portion-wise in order to avoid the risk of agglomeration or coalescence of the particles sometimes encountered when a large amount of the silane compound is added at one time.

Agitation of the reaction mixture is desirably continued after completion of the addition of the trialkoxy silane compound and/or the alkaline compound until completion of the hydrolysis-condensation reaction of the trialkoxy silane compound. If desired, the reaction mixture is heated to accelerate the reaction and the reaction can be definitely terminated when the alkaline compound as the catalyst is neutralized by the addition of an acidic compound.

After completion of the hydrolysis-condensation reaction of the trialkoxy silane compound to form a coating layer of the silicone resin on the surface of the rubber particles, the thus resin-coated rubber particles are separated from the aqueous medium by a conventional means such as dehydration by filtration, centrifugation or decantation and evaporation of the aqueous medium by heating followed by washing with water, if necessary, and drying by heating under normal pressure or reduced pressure into dry particles as the desired product. Alternatively, the reaction mixture after completion of the reaction can be spray-dried or subjected to fluidization drying so as to directly give the resin-coated rubber particles. If a small amount of agglomerates are contained in the thus dried product, the agglomerates can readily be disintegrated by using a suitable pulverizing machine such as jet mills, ball mills and hammer mills.

In the following, the silicone resin-coated silicone rubber particles and the procedure for the preparation thereof are illustrated in more detail by way of examples, in which the values of viscosity all refer to the values obtained by the measurement at 25° C. In the examples and comparative examples given below, the silicone resin-coated silicone rubber particles were evaluated in terms of the flowability and dispersibility by the testing procedures described below.

Evaluation of flowability:

A 10 g portion of the sample powder to be tested was taken in a vertically held funnel having an discharge orifice of 4 mm diameter and the time in seconds taken for the discharge of the whole amount of the sample out of the funnel was recorded under vibration of the funnel in a 1 mm amplitude on a powder testing machine (Powder Tester Model PT-E, manufactured by Hosokawa Micron Co.).

Evaluation of dispersibility:

A 2 g portion of the sample powder was subjected to screening through a screen of 200 mesh, 100 mesh or 60 mesh fineness by shaking for 90 seconds on the same powder testing machine as used above under vibration of 1 mm amplitude to record the weight % of the fractions obtained below the respective screens.

EXAMPLE 1

Into a glass beaker of 1 liter capacity were introduced 500 g of a methyl vinyl polysiloxane having a viscosity of 600 centistokes and expressed by the formula

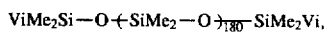

in which Vi is a vinyl group and Me is a methyl group, and 20 g of a methyl hydrogen polysiloxane having a viscosity of 30 centistokes and expressed by the formula

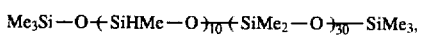

to form a polysiloxane mixture which was agitated by using a homomixer working at 2000 rpm. Thereafter, 1 g of a polyoxyethylene (9 moles addition) octylphenyl ether and 150 g of water were added to the beaker and the mixture was further agitated at 6000 rpm so that an increase in the viscosity of the mixture was noted due to a phase inversion followed by further continued agitation and addition of 329 g of water to give an O/W-type aqueous emulsion.

The aqueous emulsion was transferred into a glass flask equipped with a stirrer and admixed, under continued agitation at room temperature, with 1 g of a toluene solution of a chloroplatinic acid-olefin complex in a concentration of 0.05% as platinum and 1 g of the same surface active agent as above to effect the hydrosilation reaction of the polysiloxanes over a period of 12 hours to give an aqueous dispersion of silicone rubber particles, of which the particle size distribution was measured on a particle size testing machine (Coulter Counter, manufactured by Coulter Electronics Co.) to find a value of 15.0 μm. A small portion of the aqueous dispersion was taken and air-dried to give a white rubber powder consisting of rubber particles having elasticity.

A mixture consisting of 2290 g of water, 580 g of the above prepared aqueous dispersion containing 302 g of the rubber particles and 60 g of 28% ammonia water was agitated at 10° C. in a glass flask of 3 liter capacity with a stirrer rotating at 200 rpm. The aqueous mixture in the flask had a pH of 11.2. Thereafter, 65 g of methyl trimethoxy silane were added dropwise into the flask over a period of 20 minutes while keeping the mixture in the flask at 5 to 15° C.

11

After completion of the dropwise addition of the silane compound, the reaction mixture was further agitated for 4 hours at the same temperature followed by further continued agitation for 1 hour at an increased temperature of 55° to 60° C. to complete the reaction. The thus obtained aqueous dispersion was filtered through a pressurizable filter to obtain a cake of which the content of water was about 30% by weight.

The wet cake obtained above was dried at 105° C. in a hot-air circulation oven to give a dried cake in a yield of 97%, which was disintegrated in a jet mill into particles, of which the particle configuration was spherical or globular according to the examination with an optical microscope. Further, the average particle diameter of the particles was determined for an aqueous dispersion of the particles prepared by using a surface active agent with a Coulter Counter to give a value of 15.4 μm.

Table 1 below shows the results of the evaluation tests of the flowability and dispersibility of the above prepared particles determined according to the testing procedures described above.

EXAMPLE 2

The experimental procedure was substantially the same as in Example 1 except that the coating treatment of the rubber particles was conducted in a reaction mixture prepared from 1450 g of the same aqueous dispersion of the silicone rubber particles as prepared and used in Example 1, 1450 g of water, 50 g of 28% ammonia water and 50 g of methyl trimethoxy silane. The reaction mixture had a pH of 11.3. The thus prepared particles had a spherical or globular particle configuration and the average particle diameter thereof was 15.1 μm.

Table 1 also shows the results of the evaluation tests for this product.

EXAMPLE 3

Another aqueous dispersion of silicone rubber particles was prepared in substantially the same manner as in Example 1 except that the amount of the surface active agent used in the preparation of the O/W-type emulsion was 5 g instead of 1 g. The average particle diameter of the silicone rubber particles contained in this dispersion was 3.2 μm and a white powder consisting of rubber particles having rubbery elasticity was obtained therefrom by air-drying.

The procedure for the coating treatment of the silicone rubber particles was just the same as in Example 1 excepting replacement of the aqueous dispersion of the silicone rubber particles with the above prepared second aqueous dispersion of silicone rubber particles. The thus prepared silicone resin-coated silicone rubber particles had a spherical or globular particle configuration and the average particle diameter thereof was 3.3 μm.

Table 1 also shows the results of the evaluation tests for this product.

EXAMPLE 4

The experimental procedure was substantially the same as in Example 1 except that 65 g of methyl trimethoxy silane were replaced with a mixture of 55 g of the same silane compound and 10 g of N-(2-aminoethyl)-3-aminopropyl trimethoxy silane. The reaction mixture had a pH of 11.4. The thus prepared silicone resin-coated silicone rubber particles had a spherical or globular particle configuration

12 and the average particle diameter thereof was 15.4 μm.

Table 1 also shows the results of the evaluation tests for this product.

COMPARATIVE EXAMPLE 1

The experimental procedure was substantially the same as in Example 1 except that the amount of methyl trimethoxy silane used in the coating treatment of the silicone rubber particles was 5 g instead of 65 g and this amount was added at one time to the aqueous dispersion of the silicone rubber particles. The thus obtained resin-coated silicone rubber particles had spherical particle configuration with an average particle diameter of 15.0 μm. Table 1 also shows the results of the evaluation tests for this product.

COMPARATIVE EXAMPLE 2

The aqueous dispersion of silicone rubber particles prepared in Example 1 was, without undertaking the resin-coating treatment by using methyl trimethoxy silane, subjected, after heating to 90°C., to the dehydration and drying treatment in the same manner as in Example 1 to give a dried powder product of uncoated silicone rubber particles. Table 1 also shows the results of the evaluation tests for this product before resin-coating.

TABLE 1

| | | Flow-ability, seconds | Dispersibility, % fraction passing through screen of | | |
|---|---|---|---|---|---|
| | | | 60 mesh | 100 mesh | 200 mesh |
| Example | 1 | 25 | 97 | 89 | 60 |
| | 2 | 39 | 91 | 64 | 13 |
| | 3 | 32 | 91 | 84 | 57 |
| | 4 | 12 | 99 | 96 | 85 |
| Comparative Example | 1 | 180≦ | 15 | 5 | 0 |
| | 2 | 180≦ | 8 | 3 | 0 |

What is claimed is:

1. A powder consisting of particles of a silicone of which each of the particles has a composite structure consisting of a spherical or globular particle of a cured silicone rubber having an average particle diameter in the range from 0.1 to 100 μm and a coating layer of a polyorganosilsesquioxane resin, the coating amount of the polyorganosilsesquioxane resin being in the range from 1 to 500 parts by weight per 100 parts by weight of the silicone rubber particles without coating.

2. The powder as claimed in claim 1 in which the polyorganosilsesquioxane resin is represented by the unit formula $R^2SiO_{1.5}$, in which $R^2$ is an unsubstituted or substituted monovalent hydrocarbon group having 1 to 20 carbon atoms.

3. The powder as claimed in claim 1 in which the amount of the polyorganosilsesquioxane is in the range from 5 to 100 parts by weight per 100 parts by weight of the silicone rubber particles without coating.

4. A method for the preparation of a powder consisting of silicone resin-coated silicone rubber particles which comprises the step of: admixing an aqueous dispersion of particles of a cured silicone rubber having an average particle diameter in the range from 0.1 to 100 μm with an alkaline compound and a trialkoxy silane compound represented by the general formula $$R^2Si(OR^1)_3,$$

in which $R^2$ is an unsubstituted or substituted monovalent hydrocarbon group having 1 to 20 carbon atoms and $R^1$ is an alkyl group having 1 to 6 carbon atoms, at a temperature not exceeding 60° C. under agitation of the mixture.

5. The method for the preparation of a powder consisting of silicone resin-coated silicone rubber particles as claimed in claim 4 in which the alkaline compound is ammonia in the form of ammonia water.

6. The method for the preparation of a powder consisting of silicone resin-coated silicone rubber particles as claimed in claim 4 in which the amount of the alkaline compound is such that the mixture after the addition thereof has a pH in the range from 10.0 to 13.0.

7. The method for the preparation of a powder consisting of silicone resin-coated silicone rubber particles as claimed in claim 4 in which the amount of the trialkoxy silane compound is such that the amount of the polyorganosilsesquioxane formed by the hydrolysis-condensation reaction thereof is in the range from 1 to 500 parts by weight per 100 parts by weight of the silicone rubber particles before coating.

8. The method for the preparation of a powder consisting of silicone resin-coated silicone rubber particles as claimed in claim 4 in which the aqueous dispersion of particles of a cured silicone rubber is formed by the hydrosilation reaction between a vinyl group-containing organopolysiloxane and an organohydrogenpolysiloxane emulsified in an aqueous medium.

9. The method for the preparation of a powder consisting of silicone resin-coated silicone rubber particles as claimed in claim 4 in which the amount of the particles of a cured silicone rubber is in the range from 1 to 60 parts by weight per 100 parts by weight of the aqueous dispersion containing the same.

10. The method for the preparation of a powder consisting of silicone resin-coated silicone rubber particles as claimed in claim 4 in which the temperature at which the mixture is agitated is in the range from 5° to 20° C.

* * * * *